United States Patent [19]

Horwitz

[11] Patent Number: 4,465,551

[45] Date of Patent: Aug. 14, 1984

[54] GRADED MICROSTRUCTURED LAYERS FORMED BY VACUUM ETCHING

[76] Inventor: Christopher M. Horwitz, Room 13-3061, M.I.T., 77 Massachusetts Ave., Cambridge, Mass. 02139

[21] Appl. No.: 350,313

[22] Filed: Feb. 19, 1982

Related U.S. Application Data

[63] Continuation of Ser. No. 147,487, May 7, 1980, abandoned.

[51] Int. Cl.³ .................. B44C 1/22; C03C 15/00; C03C 25/06
[52] U.S. Cl. .................. 156/643; 156/646; 156/659.1; 156/663; 156/904; 204/192 EC; 204/192 E; 427/38
[58] Field of Search .............. 156/643, 646, 659.1, 156/663, 904; 204/192 EC, 192 E; 427/38, 162, 180, 294, 250

[56] References Cited

U.S. PATENT DOCUMENTS 4,284,689  8/1981  Craighead et al. ............. 204/192 E

*Primary Examiner*—William A. Powell
*Attorney, Agent, or Firm*—Thomas J. Engellenner

[57] ABSTRACT

Into the surface of a material a microstructure determined by an agglomerated thin film is reactively sputter-etched forming a graded-index layer which is useful in optical reflection reduction.

The layer is also useful in the formation of directed crystalline surfaces because of the small structure sizes which can be attained, and because of the anisotropy (directionality) which can be introduced into the etched surface.

9 Claims, No Drawings

GRADED MICROSTRUCTURED LAYERS FORMED BY VACUUM ETCHING

This is a continuation of application Ser. No. 147,487 filed May 7, 1980, now abandoned.

BACKGROUND OF THE INVENTION

1. Field of the Invention

This invention relates to a method of vacuum processing of materials to reduce their optical reflection, and in the case of transparent substrates of increasing their optical transmission. It uses a random but controlled etch mask of globular material to form vacuum-etched microstructures in surfaces.

By suitably recoating the globular layer and substrate at an intermediate stage of the etching process, it is possible to fabricate surfaces with anisotropy which are useful in the crystallisation of thin amorphous films.

2. Description of the Prior Art

The optical properties of graded-index layers have been investigated, both experimentally and theoretically, for some time. By graded-index is meant that the optical refractive index varies in a monotonic fashion between two optical materials, such as between silicon and air. The index may vary stepwise, as would be the normal case with evaporated thin films, or continuously over some values of refractive index; however in general it has been found that graded films can have desirable performance over a wide range of incident wavelengths and angles. Theoretical work on graded layers has been done by R. Jacobsson, in Progress in Optics, edited by E. Wolf (North-Holland, Amsterdam, 1966), Chapter V, pages 247 to 286, and the application of such graded layers to high-index substrates such as germanium is described by J. A. Dobrowolski, in Handbook of Optics, edited by W. C. Driscoll and W. Vaughan (McGraw-Hill, New York, 1978), Chapter 8, pages 8-54 to 8-56. Unfortunately thin-film coating materials suitable for grading glass or quartz, which have a relatively low refractive index, to air, are not available since materials of extremely low refractive index would necessarily be tenuous and fragile. Materials of such low index have been graded by several methods in the past, all of them involving the use of wet (in liquid or fume form) chemical reagents which attack some constituents of the surface of the material. Depending on the heat treatment of the material and on the etching bath, various degrees of grading have been achieved. Examples of glass etching methods can be found in F. H. Nicol, RCA Review, Vol. 10, no. 3, September 1949, pages 440 to 447, and M. J. Minot, Journal of the Optical Society of America, Vol. 66, no. 6, June 1976, pages 515 to 519, and Vol. 67, no. 8, August 1977, pages 1046 to 1050.

Another case in which grading is desirable but difficult is that of metals. It is often desirable to make metallic surfaces highly absorbing over fairly broad, but specific optical wavelength ranges, for instance for solar-selective surface fabrication (for a general description of some solar-selective surfaces, see A. B. Meinel and M. P. Meinel, Physics Today, Vol. 25, no. 2, February 1972, pages 44 to 50). Suitable grading methods up to now have involved the deposition of graded composite (metal-ceramic mixture) materials or the formation of microstructures on the metal surface, sometimes by vacuum sputtering in a contaminated environment. Examples of such sputtered microstructures can be found in J. L. Vossen, Journal of Vacuum Science and Technology, Vol. 8, no. 5, 1971, pages S12 to S30, on page S22, where backing-plate contamination caused varying microstructures to be formed on a silicon surface. In addition, W. R. Hudson, Journal of Vacuum Science and Technology, Vol. 14, no. 1, Jan/Feb 1977, pages 286 to 289 shows how contamination ("seed") material was sputtered onto a surface while the surface was being sputter-etched, giving structures which depended greatly on the surface temperature, surface material, "seed" material, and position of the "seed" source. Another similar reference is R. S. Berg and C. J. Kominiak, Journal of Vacuum Science and Technology, Vol. 13, no. 1, 1976, pages 403 to 405, where microstructural layers on surfaces were formed by sputter-etching through contamination layers already present on the surfaces, and through layers, formed on the surfaces while sputter-etching, which probably originated from the surface-support table. All of these methods resulted in surfaces of widely variable, highly process-dependent structures, and none of these methods is suitable for the direct formation of anti-reflecting, highly transmitting graded layers.

In the present context, sputter-etching is taken to mean the removal of material from a surface which is bombarded by energetic species (atoms, molecules, and their ionized forms) in a vacuum system to which is introduced a gas or mixture of gases. These energetic species result from an electric discharge inside the vacuum system, and may be formed directly above the surface, or in an "ion gun" at some distance from the surface. The term "reactive sputter-etching" refers to sputter-etching where the bombarding species is chemically reactive with some of the surface materials in such a fashion that the surface material is largely prevented from redepositing on the surface, and is instead carried away from the sputtering region by the pumped flow of the gases employed. Examples of reactive sputter-etching gases are: for silicon and silicon compounds; hydrogen, carbon tetrafluoride and other chloro-fluorocarbons, and their mixtures with oxygen: for tin and tin compounds: hydrogen and mixtures of hydrogen and oxygen. The effects of reactive sputter-etching, as opposed to those of standard sputter-etching, are well described in several papers; for instance H. W. Lehmann and R. Widmer, Journal of Vacuum Science and Technology, Vol. 15, no. 2, March/April 1978, pages 319 to 326, and N. Hosokawa, R. Matsuzaki, and T. Asamaki, Proc. 6th International Vacuum Congress, 1974; Japanese Journal of Applied Physics Supplement 2, part 1, 1974, pages 435 to 438. These papers describe a form of reactive sputter-etching which is the preferred embodiment for the present invention, but which is not the only possible method. This form has the incident energetic species approaching approximately normally incident to the surface to be etched, however here we will also allow isotropic incidence, a case which is often referred to in the literature as "plasma etching".

Here we also define a globular layer as a layer which is formed by the deposition of a material onto a surface such that the material self-agglomerates into a layer of non-uniform thickness. That is, the internal forces of the globular layer material combined with the structure and interaction forces of the surface, act to cause the layer material to form in a non-uniform fashion on the surface. The thickness varies on a microscopic scale so that the surface appears to be rough under microscopic examination. For instance, the spatial period of thickness variations, though inherently random, may be of the order of 100 micrometers to one nanometer. Globular layers may be formed as separated islands of material or as closely contiguous protruberances. One possible method of forming globular surfaces is the in-situ polymerisation of a monomer to form closely spaced spherical particles on the surface: this method is actually well known to produce particles of exceptional regularity. globular layers can also be formed from metals of relatively low melting point by evaporation of a thin metal layer onto a heated surface. Examples of such globular metal layers are in C. M. Horwitz, R. C. McPhedran, and J. A. Beunen, Journal of the Optical Society of America, Vol. 68, 1978, pages 1023 to 1031, and C. M. Horwitz, Applied Physics Letters, Vol. 36, no. 9, May 1, 1980, pages 727 to 730. It is often necessary to deposit an intermediate layer between the surface and the globular layer in order to assure proper globular layer formation, but this in no way affects the basis of the following invention.

Anisotropic surface structures, that is structures which have orientation directions in the surface plane, have been shown to be of value for the crystallisation of semiconductors see for instance M. W. Geiss, D. C. Flanders, H. I. Smith, Applied Physics Letters Vol. 35, July 1, 1979, pages 71 to 74, in which a regular anisotropic surface was used in the crystallisation of a silicon surface. Up to the present, such anisotropic surfaces have required complex and expensive processing to attain the fine structures required.

SUMMARY OF THE INVENTION

A method of forming microstructured surfaces by a vacuum etching process has now been found which can give predictable and easily adjustable graded layers for use in applications requiring low optical reflection.

This invention employs a globular layer which is deposited onto a surface. The globular layer acts as an erodable etch mask for a reactive sputter-etching process.

The reactive sputter-etching conditions, and the globular layer material, are all selected to ensure that the surface and globular materials are etched at an appropriate rate ratio. For instance, in general this requires that the etch gases reactively sputter-etch the surface, but do not reactively sputter-etch the globular layer.

The cross-section of the resulting surface microstructures is affected by a number of factors. The range of angles of incidence of the sputtering species has an effect which is well documented in the literature on plasma etching of semiconductor materials, as well as being described well in the aforementioned reference to Lehmann and Widmer. The relative etch rates of the surface and globular materials, and the cross-section of the particles in the globular film, also determines the cross-sectional shape of the microstructures produced: for a very rapid surface etch rate, tall pillars would be formed underneath the isolated islands of the globular material. For an intermediate relative surface etch rate, roughly conical structures result since erosion of the globular layer results in a changing etch-mask profile with time.

The average spatial period of the surface microstructures is determined by the average spatial period of the globular layer alone, and this can be economically varied over a wide range with most globular film-forming methods, in contrast with standard pattern-generation techniques.

In another aspect of this invention, the etched structure depth may be enhanced by recoating a partially etched structure with the globular film material, or with some other etch-gas resistant material, and further etching the structure.

In another aspect of this invention, the globular film, or a partially etched globular film/surface structure, may be coated with an etch-gas resistant material at an angle in order to form a mask microstructure which is anisotropic, having axes along and normal to the projection of the coating direction onto the surface. When etched further, the anisotropy is transferred to the surface.

In another aspect of this invention, the surface microstructure produced can be coated with another material to enhance the optical properties desired.

In the following text several examples of the use of the above methods are given which illustrate this invention further.

DETAILED DESCRIPTION

Example 1

A substrate may be coated with a layer of tin oxide, which is an appropriate layer for reactive sputter-etching. This substrate is then heated to about 300 degrees Celsius and coated by vacuum evaporation of a thin (30 nm) film of metal (aluminum). The assembly of films is then placed onto the target plate of a radio-frequency sputtering system, which raises the surface to a high negative potential in a low pressure of reactive sputter-etching gas, in this case a hydrogen-oxygen mixture. The globular and substrate layers become etched, forming a graded interface layer between the tin oxide and the air. This layer may then be coated with a metal film to obtain a surface of low thermal emittance and high solar absorptance, as is described by C. M. Horwitz, in "Vacuum Preparation of Etched Anti-Reflecting Class", Paper P-122, International Solar Energy Society, International Congress, 1979, Proceedings.

Example 2

A quartz substrate may, as in Example 1, be heated then coated with an aluminum layer, then reactively sputter-etched to form a graded interface layer. This layer could be coated with a metal as described in Example 1, but because of the low refractive index of quartz, this graded high-transmittance layer is inherently useful. The layer has a wide wavelength range, and its optical properties have been described in the reference quoted in Example 1, and in C. M. Horwitz, Applied Physics Letters, Vol. 36, no. 9, May 1, 1980, pages 727 to 730. This latter reference describes the effect of using a carbon tetrafluoride sputter-etching gas on aluminum layers of varying thickness. This latter reference also describes the effect of recoating a partially etched sample with the globular film material, which is then etched further. The resulting structure had a microstructure (depth/spatial period) ratio about three times larger than was obtained with a single coating and etching process. In addition, the structures had a pronounced anistropy caused by the large angle of incidence at which the recoating was performed. This latter reference also describes the optical properties of quartz slides treated on both faces by reactive sputter-etching through a globular aluminum layer, where it was found that an optical transmittance of more than 97% could be attained over wavelength ranges of almost 2 to 1 with a single coating and etching process using a carbon tetrafluoride etch gas.

I claim:

1. A method of forming graded microstructures upon a substrate, the method comprising:
   (a) coating the substrate with a globular material, the material being chosen for its ability to self-agglomerate upon the substrate to form a non-uniform coating of varying thickness;
   (b) vacuum etching the coated substrate in the presence of at least one reactive gas, whereby portions of the substrate are etched to different depths depending upon the thickness of the overlying globular material, thus producing a graded microstructure upon the substrate.

2. The method of claim 1 wherein the step of coating the substrate with a globular material further comprises coating the substrate by heating the substrate and evaporating a thin film of globular material onto the substrate within a vacuum chamber.

3. The method of claim 2 wherein the globular material is a material chosen from the group of at least one metal or metallic compound.

4. The method of claim 3 wherein the material is aluminum.

5. The method of claim 1 wherein the step of vacuum etching further comprises etching the coated substrate by by applying an electric voltage to the coated substrate and causing a reactive gas to bombard the coated substrate.

6. The method of claim 5 wherein the reactive gas is chosen from the group of at least one gas containing hydrogen, halogens, halocarbons, or their mixtures with oxygen.

7. The method of claim 5 wherein the electric voltage is variable and the method further comprises varying the substrate electric voltage at a radio frequency.

8. The method of claim 1 wherein the substrate is an optical material.

9. The method of claim 1 wherein the substrate is a substrate for a solar radiation absorbing metallic surface.

* * * * *